United States Patent [19]

Downs et al.

[11] Patent Number: 5,238,606

[45] Date of Patent: Aug. 24, 1993

[54] STABILIZATION OF POLYPOLS WITH LIQUID ANTISCORCH COMPOSITION

[75] Inventors: Bruce W. Downs, Cheshire; Paul E. Stott, Sandy Hook; Lawrence B. Barry, Newington; Mark C. Richardson, Cheshire, all of Conn.

[73] Assignee: Uniroyal Chemical Company, Inc., Middlebury, Conn.

[21] Appl. No.: 590,104

[22] Filed: Sep. 28, 1990

[51] Int. Cl.$^5$ .................. C09K 15/08; C09K 15/18; C09K 15/32

[52] U.S. Cl. ............................ 252/400.24; 252/401; 252/402; 252/404; 568/581; 568/582

[58] Field of Search ........... 252/401, 403, 404, 400.24, 252/581; 568/581, 582

[56] References Cited

U.S. PATENT DOCUMENTS

| | | | |
|---|---|---|---|
| 3,437,694 | 4/1969 | Austin | 568/581 |
| 3,567,664 | 3/1971 | Haring | 521/128 |
| 3,637,865 | 1/1972 | Haring | 528/76 |
| 3,809,723 | 5/1974 | Niu et al. | 568/581 |
| 4,007,230 | 2/1977 | Hinze | 252/403 |
| 4,010,211 | 3/1977 | Preston et al. | 568/582 |
| 4,021,385 | 5/1977 | Austin et al. | 568/582 |
| 4,070,304 | 1/1978 | Hinze | 252/403 X |
| 4,242,224 | 12/1980 | Dean, II et al. | 252/403 |
| 4,444,676 | 4/1984 | Statton et al. | 568/582 |
| 4,794,126 | 12/1988 | Fesman et al. | 521/117 |
| 4,933,374 | 6/1990 | Suhoza et al. | 252/403 |

OTHER PUBLICATIONS

Die Angewandte Markromolekulare Chemie, vol. 137, 1985, Basel CH pp. 83–92; J. J. Zeilstra: 'Heat Stabilization of Segmented Copolymer (Ether Ester)s'.

*Primary Examiner*—Deborah L. Kyle
*Assistant Examiner*—Valerie Fee
*Attorney, Agent, or Firm*—Raymond D. Thompson

[57] ABSTRACT

The invention relates to the use of certain styrenated diphenylamine and hindered phenol compositions for the stabilization of polyether polyols.

8 Claims, No Drawings

STABILIZATION OF POLYPOLS WITH LIQUID ANTISCORCH COMPOSITION

BACKGROUND OF THE INVENTION

1. Field of the Invention

The present invention relates to the stabilization of polyoxyalkylene polyether polyols and the use of the stabilized polyols in the preparation of polyurethane foam. In particular the invention relates to stabilization of polyols with certain liquid stabilizer compositions and the color or scorch inhibition of flexible and semi-flexible polyurethane foams made from the stabilized polyols.

2. Background and Related Art

Prior art methods for the stabilization of polyalkylene polyether polyols with antioxidants or stabilizers and the use of stabilized polyols in the preparation of polyurethane foams to inhibit scorch are well known.

U.S. Pat. Nos. 3,567,664 and 3,637,865 disclose polyurethane foams stabilized with a mixture of 2,6-di-tert-butyl-4-methyl phenol [butylated hydroxy toluene (BHT)] and p,p'-dialkyldiphenylamines. U.S. Pat. No. 4,010,211 teaches the addition of phenothiazine to a BHT/p,p'-dialkyldiphenylamine mixture. U.S. Pat. No. 4,794,126 discloses flame-retardant polyurethane foams stabilized with a combination of a diarylarylenediamine reaction product of diarylamine and alkyl ketone and a hindered phenol, specifically 3,6'-di-tert-butyl-4-sec-butyl phenol.

The stabilizers of the aforementioned prior art are solids and are generally dissolved in the polyol media by heating. To remove any undissolved stabilizer solids, the entire voluminous polyol mass is subject to a filtration step, after which the polyol precursor can be cured to the final foam product.

Statton, in "Evaluation of Hindered Phenols for Minimization of Foam Discoloration Using the Microwave Scorch Test" in J. CELLULAR PLASTICS, 346 (1984) studied four phenols in combination with the solid antioxidant p,p'-dioctyldiphenylamine alone and in the presence of phenothiazine. Although systems containing the BHT hundred phenol were fairly effective polyol stabilization packages, systems comprised of 2,6-di-tert-butyl-4-sec-butylphenol and p,p'-dioctyldiphenylamine did not provide satisfactory scorch resistance. In the Statton systems described, the amine appeared to be more effective in reducing scorch than the phenolic antioxidant. Even at maximum concentrations, this combination would not provide good scorch resistance in the polyols used.

U.S. Pat. No. 4,933,374 discloses polyoxyalkylene polyether polyol Compositions protected against oxidative degradation with a stabilizing amount of a synergistic mixture of 2,6-di-tert-butyl-4-sec-butyl phenol and a reaction product of diisobutylene, styrene, and diphenylamine wherein the weight ratio of the diisobutylene to the styrene is from about 2:1 to 5:1.

It would therefore be advantageous to have a liquid system of polyol stabilizers which are soluble in the polyol media at ambient temperatures. Two steps of the conventional process could therefore be eliminated, i.e., the dissolution of the stabilizer in the polyol media by heating and removal of the undissolved stabilizer solids by filtration. Serendipitously, additional advantages of liquid stabilizer compositions are their ability to be added to the polyol by metering or pumping which result in added convenience and safety.

SUMMARY OF THE INVENTION

The stabilizer system of the instant invention is a synergistic blend of liquids. It has been discovered that certain styrenated diphenylamines will provide excellent scorch resistance when combined with certain hindered phenols.

Another aspect of this invention concerns a method for the stabilization of polyalkylene polyether polyols against oxidative degradation and the use of such a stabilized polyol together with polyisocyanates to prepare scorch stabilized polyurethane foams.

DETAILED DESCRIPTION OF THE INVENTION

The instant invention relates to the use of styrenated diphenylamine and hindered phenol compositions for the stabilization of polyols.

Unexpectedly, the styrenated diphenylamine and the hindered phenol compositions of the invention produce synergistic antioxidant effects in polyols when combined in certain ratios.

The styrenated amines can be prepared from diphenylamines which can readily be alkylated by vinyl aromatic compounds as taught in, for example, U.S. Pat. Nos. 3,505,225 and 3,649,690, herein incorporated by reference.

The styrenated diphenylamines used have different amounts of each isomer combination taken from the group consisting of ortho-, para-, ortho-/ortho-, ortho-/para-, para-/para-, and tristyrenated diphenylamine. The isomers may be represented by formula I:

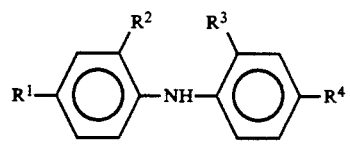

where $R^1$, $R^2$, $R^3$, and $R^4$ may be the same or different and are selected from the group consisting of

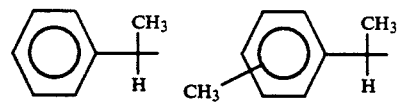

styryl, methyl styryl, and hydrogen, with the proviso that the $R^1$, $R^2$, $R^3$ and $R^4$ cannot all be hydrogen. The position and number of $R^1$, $R^2$, $R^3$, and $R^4$ groups on the diphenylamine are all significant as will become obvious from the examples that follow.

The phenolic component has the structure of formula II:

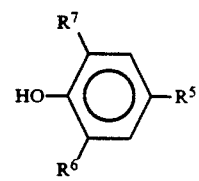

wherein $R^5$, $R^6$ and $R^4$ maybe the same or different and are selected from the group consisting of $C_1$–$C_8$ alkyl, phenyl and phenyl($C_1$–$C_6$)alkyl. There are two formula II phenols that are commercially available as liquids or low melting solids. When $R^5$ is $CH_3$ and $R^6$ and $R^7$ are t-butyl groups, the compound of formula II is commonly known as butylated hydroxy toluene (BHT), and is commercially available from Uniroyal Chemical Company, Inc. under the trademark Naugard BHT. Another phenol is commercially available under the trademark VANOX 132 (RT Vanderbilt Company) and has the structure of formula II wherein $R^5$ is sec-butyl and $R^6$ and $R^7$ are both t-butyl.

In the following table, a mixture of isomers of styrenated diphenylamines and 2,6-di-tert-butyl-4-sec-butyl-phenol (Vanox 132) were combined in various ratios. Each combination was also tested for polyol stabilizer performance. The amounts specified in Table I are in parts per million (ppm) by weight. Scorch resistance of the resulting polyurethane foams was determined by the microwave scorch test described below.

EXAMPLES 1–7

A premix of 10.0 grams of water, 0.40 grams of A-1* and 2.0 grams of L-5810 was added to 200 grams of a 3000 average molecular weight polyether polyol which had minimal initial stabilization (100 ppm BHT) but also containing the stabilizer package indicated in Table I below. The mixture was stirred for five seconds in a high speed Lightning Mixer. Then 0.40 grams of T-10 catalyst* was added and the resulting mixture stirred for five seconds in the Lightning Mixer. Finally, 126.0 grams of TDI-80**** was added and the mixture stirred in the Lightning Mixer for 7 seconds and subsequently poured into a 10"×10"×5" cardboard box. The foam was allowed to rise completely at room temperature and then permitted to stand for an additional 5 minutes. The sides of the box were removed, before curing the sample in a microwave oven for 5 minutes and 30 seconds at 50% power. The foams were then immediately air oven cured for 3 minutes at 125° C. and the buns subsequently sliced in half to observe the internal discoloration.

* A-1 is a tertiary amine catalyst sold by Union Carbide.
** L-5810 is a silicone surfactant sold by Union Carbide.
*** T-10 is a tin catalyst, specifically stannous octoate in dioctylphthalate.
**** TDI-80 is toluene diisocyanate (80% 2,6–20% 2,4) sold by Mobay.

Performance/Scorch ratings are based on the following scale:

1 = no discoloration (white) to trace of yellow
2 = slight yellow
3 = light yellow
4 = dark yellow/slightly brown
5 = light brown
5+ = dark brown/burned

TABLE I

| Compositions | 1 | 2 | 3 | 4 | 5 | 6 | 7 |
|---|---|---|---|---|---|---|---|
| Sample 1(ppm) | 4500 | — | 900 | 1800 | 2700 | 3600 | — |
| Vanox 132(ppm) | 4500 | 3600 | 2700 | 1800 | 900 | — | |
| Sample 4(ppm) | | | | | | | |
| Performance/ Scorch Rating | 5+ | 5+ | 2 | 1 | 1 | 5 | |

Notes for Table
The isomeric composition of Sample 1 is shown in the first line of Table II.
The isomeric composition of Sample 4 is shown in the fourth line of Table II The results of the performance tests given in Table I show that compositions 4 and 5 have the highest performance ratings. It can further be seen from the above Table that the optimal ratios of phenol:amine combinations range from 40:60 to 60:40.

EXAMPLES 8–15

Further studies using controlled phenol:amine ratios were performed, and the ratio of the amounts of each positional isomer of the styrenated diphenylamine with various phenols were compared by observing the scorch stability of the polyols being stabilized.

The polyols used in these tests were selected from the commercially available polyols Voranol 3137 (trademark of the Dow Corporation) or Niax 16-52 (trademark of the Union Carbide Corporation). The average molecular weight of these materials is approximately 3000.

The samples presented in Table II were analyzed by gas chromatography using a Varian 3400 chromatograph. A 1-meter packed column and a flame ionization detector were also used.

The amounts of each styrenated diphenylamine isomer found as measured by the gas chromatographic method described above are shown in Table II and are given in terms of g.c. area percent of each amine component.

Compositions 8–11 each had a hindered phenol:diphenylamine ratio of 60:40, and the amount of total stabilizer package added to the polyol was 0.45% (by weight). In Compositions 8–11 the hindered phenol used was Vanox 132.

Compositions 12–15 each had a hindered phenol:diphenylamine ratio of 50:50, and the amount of total stabilizer package added to the polyol was 0.5% (by weight). In Compositions 12–15 the hindered phenol used was BHT.

In all the compositions, the polyol used was either Voranol 3137 or Niax 16-52. The choice of either one of the aforementioned polyols made no difference in the performance results.

TABLE II

| Sample | o | p | o/o | o/p | p/p | tri | Composition Performance/ Scorch rating |
|---|---|---|---|---|---|---|---|
| 8 | 10 | 25 | 11 | 11 | 31 | 11 | 1 |
| 9 | 12 | 32 | 11 | 11 | 23 | 7 | 3 |
| 10 | 19 | 25 | 15 | 14 | 13 | 7 | 3 |
| 11 | 21 | 3 | 18 | 17 | 3 | 17 | 3 |
| 12 | 77 | 18 | — | — | — | — | 4 |
| 13 | 46 | 14 | 7 | 7 | 1 | — | 5 |
| 14 | — | — | 23 | 29 | 35 | 12 | 1 |
| 15 | — | — | 7 | 9 | 43 | 25 | 1 |

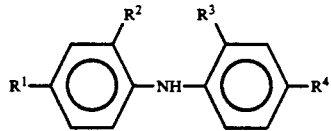

Explanation for the column headings in Table II are as follows:
Referring to the styrenated diphenylamine generic structure of formula I-
o indicates styryl substitution in the $R^2$ position only, and $R^1 = R^3 = R^4 = H$
p indicates styryl substitution in the $R^1$ position only, and $R^2 = R^3 = R^4 = H$
o/o indicates styryl substitution in the $R^2$ and $R^3$ positions and $R^1 = R^4 = H$
p/p indicates styryl substitution in the $R^1$ and $R^4$ positions and $R^2 = R^3 = H$
tri indicates three styryl substituents are present in the $R^2$, $R^3$, and $R^4$ positions and $R^1 = H$ The above data and the Performance/Scorch results show an unexpected and noteworthy trend regarding the styrenated diphenylamine component of the synergistic stabilizer system of this invention. It is well-known within the industry that any Performance/Scorch value greater than 2 is unacceptable to the polyol manufacturers. It is clear from the above data that samples 8, 14, and 15 are the only ones with acceptable Performance/Scorch values.

It is also apparent from the data above that the isomer content of the preferred compounds have a para/para isomer ratio of from 25 to 55% of the total analysis. A preferred isomer ratio being from 30 to 50%, more preferred from 31 to 43%.

The compositions of the invention may be incorporated in the polyol precursors in any amount effective to produce the desired stability. Typically, an amount of from about 0.3 to 1.0 percent will be sufficient. A preferred range is from about 0.4 to 0.6 percent by weight of the total polyol composition. Due to the liquid state of the stabilizer compositions of this invention, the stabilizer compositions may be incorporated into the polyols by stirring at ambient temperature.

The polyol components which may be stabilized with the stabilizer compositions of this invention include polyoxyalkylene polyether polyols having from about 2 to about 10 hydroxy groups per molecule. Particularly suitable polyols include those having a molecular weight of about 200 to 10,000 or higher. Preferred are polyols derived from diols and triols with a molecular weight ranging from about 100 for diols to about 6000 for triols.

The polyether polyols possess two or more ether groups in the molecule. The polyols are derived from, among others, ethylene oxide, propylene oxide, epichlorohydrin, styrene oxide, diethylene glycol, triethylene glycol, trimethylolpropane, glycerine, hexanetriol, butanetriol and the like. Polyether polyols suitable for preparation of flexible polyurethane foams and methods for their preparation are described by Frisch and Saunders (Editors) in PLASTIC FOAMS, Part 1, 118-125, (1972).

In the preparation of flexible polyurethane foams, the stabilized polyol compositions are reacted with a polyisocyanate containing two or more —N=C=O groups per molecule in the presence of catalysts, surfactants, water, and optionally, auxiliary blowing agents. Commercially available polyisocyanates include, among others, toluene and/or 2,6)diisocyanate, 4,4'-diphenylmethane diisocyanate, polyisocyanate from aniline-formaldehyde oligomers, and aliphatic isocyanates such as methylcyclohexane diisocyanates and the like.

Most stabilizer compositions have a tendency to discolor upon standing. To prolong shelf-life of the compositions of this invention, it is advantageous to add about 0.5 to 10.00 percent of a trihydrocarbyl phosphite wherein the hydrocarbyl group may be independently selected from phenyl and alkyl groups. Preferrred are alkyl derivatives having 5 to 13 carbon atoms and higher. Particularly preferred are the compounds tridecyl phosphite and phenyl diisodecyl phosphite. These compounds are well known as peroxide scavengers and their use as color stabilizers is also well known to those familiar with the art.

Because of increased safety considerations, flexible and semiflexible polyurethanes may contain flame retardants. The latter are known compounds containing phosphorus, antimony, boron, bismuth, and a halogen or combinations thereof. The polyurethanes may contain other additives such as fillers, plasticizers, deodorants, ultraviolet stabilizers, thermal stabilizers, and the like.

The data presented herein are intended to illustrate, but in no way to limit the scope of the invention. Other variations will be evident to those skilled in the art and such modifications are intended to be within the scope of this invention.

We claim:

1. A liquid polyol stabilizer system comprising: 1. A blend of diphenylamine isomers of the formula I wherein the para/para isomer where $R^2$ and $R^3$ are hydrogen constitutes between about 25 and about 55 percent by weight of the blend of diphenylamine isomers

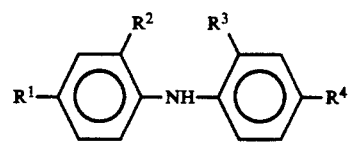

wherein $R^1$, $R^2$, $R^3$ and $R^4$ may be the same or different and are selected from the group consisting of

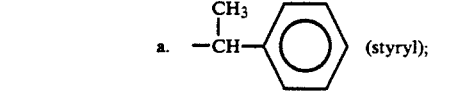

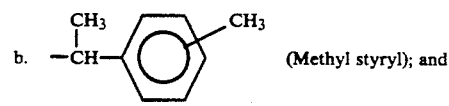

c. hydrogen; with the proviso that $R^1$, $R^2$, $R^3$ and $R^4$ cannot all be hydrogen; and

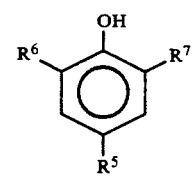

wherein $R^5$, $R^6$ and $R^7$ may be the same or different and are selected from the group consisting of $C_1$-$C_8$ alkyl, phenyl and phenyl($C_1$-$C_6$)alkyl.

2. The liquid polyol stabilizer system of claim 1 wherein the weight ratio of amine to phenol is from about 60:40 to about 40:60.

3. The liquid polyol stabilizer system of claim 1 which further contains about 0.5 to 10.0 percent by weight of trihydrocarbyl phosphite wherein the hydrocarbyl may be independently selected from phenyl and alkyl groups.

4. The liquid polyol stabilizer system of claim 3 wherein the trihydrocarbyl phosphite is tridecyl phosphite.

5. A stabilized polyether polyol composition comprising (1) a polyether polyol having from 2 to 10 hydroxy groups; and (2) a liquid stabilizer system comprising
a blend of diphenylamine isomers of the formula I wherein the para/para isomer where $R_2$ and $R_3$ are hydrogen constitutes between about 25 and about 55 percent by weight of the blend of diphenylamine isomers

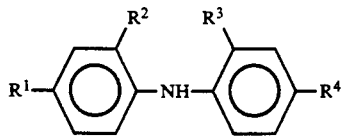

wherein $R^1$, $R^2$, $R^3$ and $R^4$ may be the same or different and are selected from the group consisting of a. —CH(CH$_3$)—C$_6$H$_5$ (styryl);

b. —CH(CH$_3$)—C$_6$H$_4$—CH$_3$ (methyl styryl); and c. hydrogen; with the proviso that $R^1$, $R^2$, $R^3$ and $R^4$ cannot all be hydrogen; and a phenol of the formula

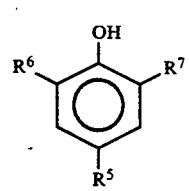

wherein $R^5$, $R^6$ and $R^7$ may be the same or different and are selected from the group consisting of $C_1$–$C_8$ alkyl, phenyl and phenyl($C_1$–$C_6$)alkyl.

6. The stabilized polyether polyol composition of claim 5 wherein the stabilizer system is present from about 0.3 to about 1.0 percent by weight based on the total composition.

7. The stabilized polyether polyol composition of claim 5 wherein the weight ratio of amine to phenol is from about 60:40 to about 40:60.

8. The stabilized polyether polyol composition of claim 5 which further contains about 0.5 to 10.0 percent by weight of the stabilizer system of trihydrocarbyl phosphite wherein the hydrocarbyl may be independently selected from the phenyl and alkyl groups.

* * * * *

UNITED STATES PATENT AND TRADEMARK OFFICE
CERTIFICATE OF CORRECTION

PATENT NO. : 5,238,606
DATED : August 24, 1993
INVENTOR(S) : Stott, et al

It is certified that error appears in the above-indentified patent and that said Letters Patent is hereby corrected as shown below:

On the title page, Item [54] Title of the Invention, delete "POLYPOLS" and insert --POLYOLS--.

Column 3, line 11, change "Vanox 132" to --Vanox 1320--.
        line 16, change "Vanox 132" to --Vanox 1320--.
        line 59, change "Vanox 132" to --Vanox 1320--.

Column 4, line 29, change "Vanox 132" to --Vanox 1320--.

Signed and Sealed this

Nineteenth Day of April, 1994

Attest:

BRUCE LEHMAN

*Attesting Officer*      *Commissioner of Patents and Trademarks*